United States Patent

[11] 3,613,715

[72] Inventor Charles E. Johnson
 Ann Arbor, Mich.
[21] Appl. No. 33,783
[22] Filed May 1, 1970
[45] Patented Oct. 19, 1971
[73] Assignee Double A. Products Company

[54] FLUID VALVE MEANS
 35 Claims, 13 Drawing Figs.

[52] U.S. Cl. .................................................. 137/269,
 137/271, 137/491, 137/514.7, 251/28
[51] Int. Cl. ..................................................F16k 17/10,
 F16k 15/06
[50] Field of Search............................................ 137/269,
 491, 495, 270, 271, 514.5, 514.7, 538, 543.19,
 543.23, 269.5; 251/43, 47, 28

[56] References Cited
UNITED STATES PATENTS

| 1,270,423 | 6/1918 | Lockridge .................... | 137/270 |
| 2,388,820 | 11/1945 | Bonnell ......................... | 137/491 |
| 2,409,091 | 10/1946 | Wright .......................... | 137/270 X |
| 2,639,102 | 5/1953 | Ball ............................... | 137/491 X |
| 2,639,103 | 5/1953 | Ball et al......................... | 137/491 X |

Primary Examiner—M. Cary Nelson
Assistant Examiner—Robert J. Miller
Attorney—Harness, Dickey & Pierce ABSTRACT: A fluid valve arrangement consisting of three basic elements; a valve housing, a valve sleeve and a valve spool; that may be assembled in a variety of ways to provide several different valve functions. By adding other components to the three basic elements still further valve functions are provided.

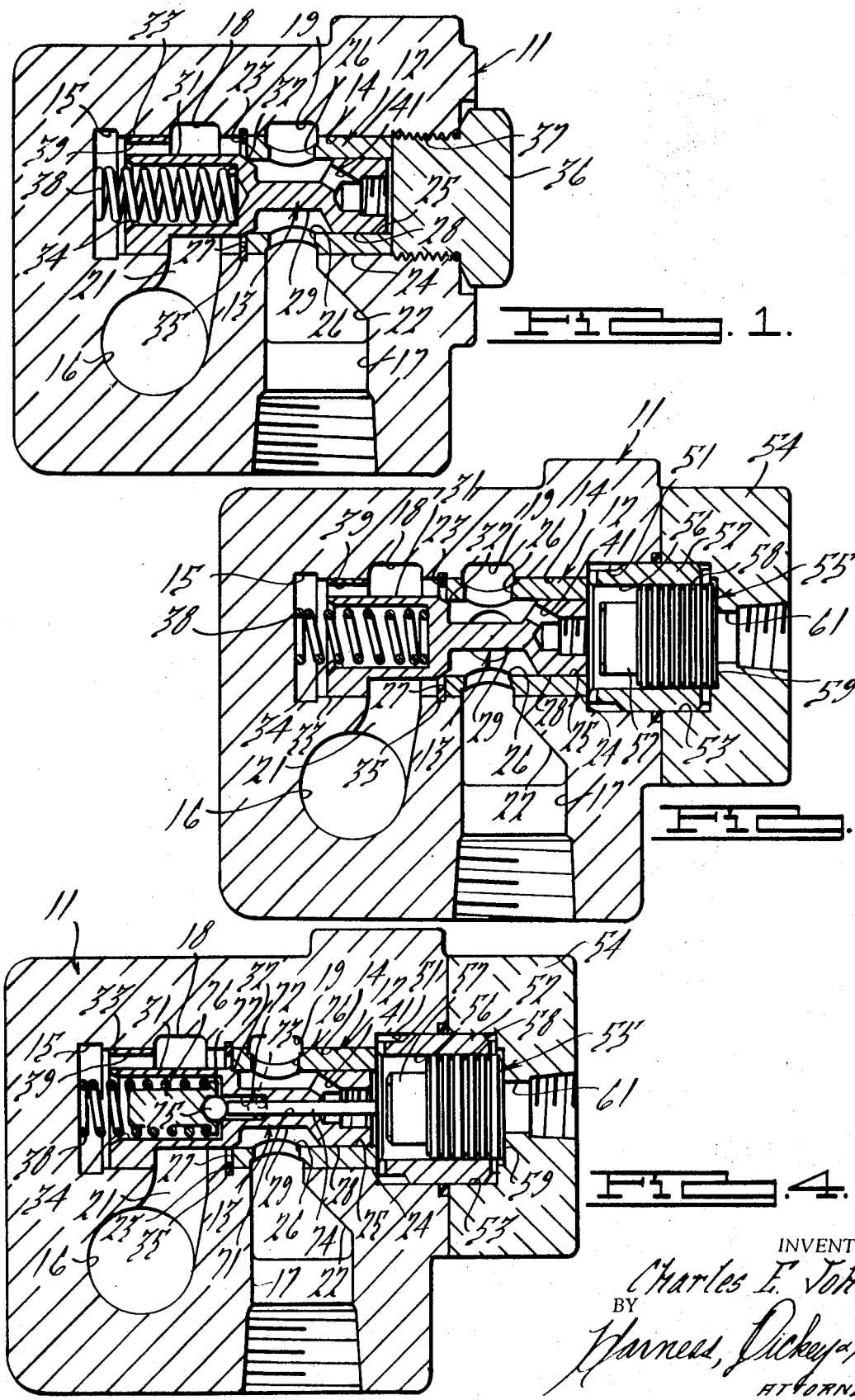

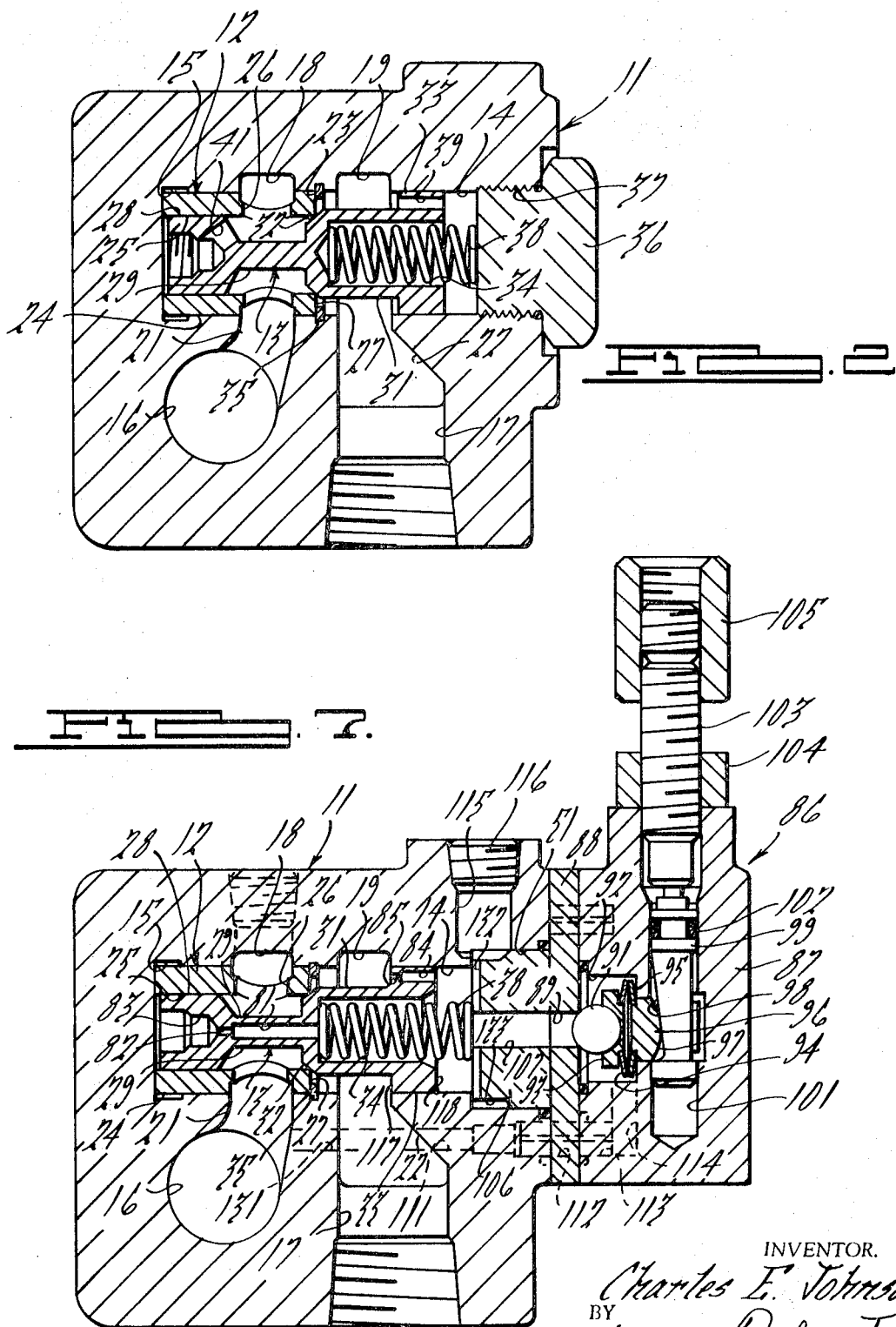

INVENTOR.
Charles E. Johnson.
BY
Harness, Dickey & Pierce
ATTORNEYS.

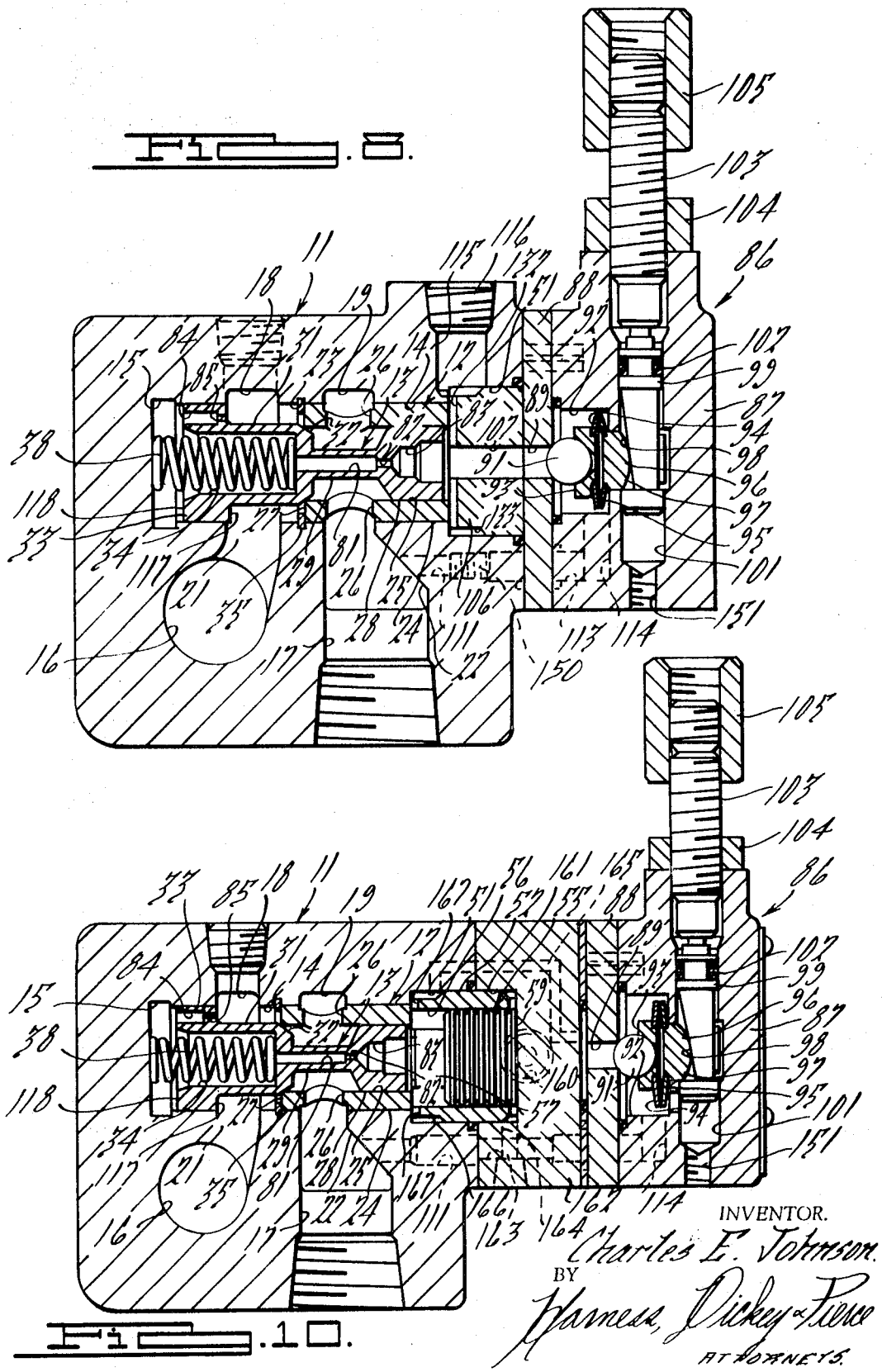

3,613,715

INVENTOR.
Charles E. Johnson
BY Harness, Dickey & Pierce
ATTORNEYS.

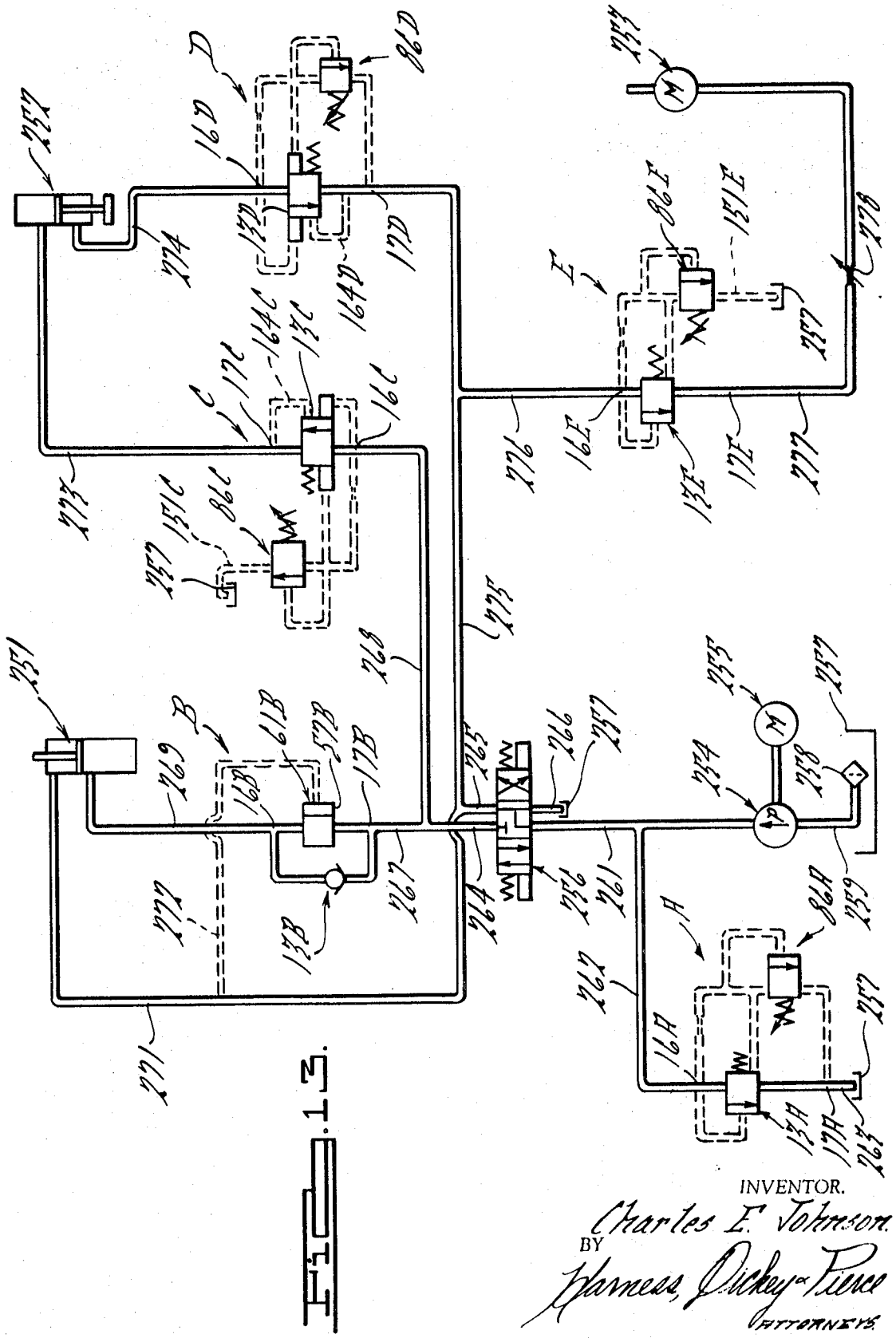

FLUID VALVE MEANS

BACKGROUND OF THE INVENTION

Definition of Terms

In order to render the following discussion and claims clearer to those skilled in the art, certain of the terms therein used will be defined. The term "pilot valve" is intended to describe a valve in which the valve element is operated by an applied pressure. The applied pressure can be applied in any fashion. The term "pilot-operated valve" as used herein refers to a differential pressure-operated valve controlled by a pilot or relief valve.

This invention relates to a fluid valve means and more particularly to a fluid valve assembly having three basic components that may be assembled in a variety of manners to provide a variety of valve functions.

Various types of fluid valves for accomplishing different valve functions are well known. Of course, the more complicated the valve function, the more complex the valve structure. For the most part, a given valve structure is designed to perform only a single valve function and if other functions are desired a different valve must be used. In addition to requiring a large inventory, this lack of standardization greatly increases the cost of the individual valve structure.

It is, therefore, a principle object of this invention to provide a valve structure having a number of basic elements that can be combined in different manners to provide different valve function.

It is another object of the invention to provide the valve structure having maximum versatility at a low cost.

It is further object of the invention to provide a convertible valve structure that requires minimum machining.

Various types of valves are pilot operated. That is, the main valve member is generally fluid balanced and a smaller pilot or relief valve operates at a predetermined pressure to upset the pressure balance and operate the main valve. These pilot-operated valves rely upon a flow through the pilot or relief valve to operate the main valve and to maintain the main valve in its operative condition. The advantages of pilot-operated valves are well known. However, in many instances pilot-operated valves can not be used due to the excess loss of fluid resulting from the flow through the pilot valve.

It is, therefore, a further object of this invention to provide pilot-operated valve that minimizes the amount of fluid lost through the pilot valve.

SUMMARY OF THE INVENTION

A valve assembly embodying this invention is comprised of at least three elements adapted to be assembled in a variety of orientations for serving different functions. The three elements comprise a valve housing, a valve sleeve and a valve spool. The valve housing defines a bore and a pair of passages intersect the valve housing bore at locations spaced along its axis. The valve sleeve has an external surface complementary to the valve housing bore, a bore extending at least in part through the valve sleeve, and a passage extending from its external surface to its bore. The valve sleeve is received at least in part in the valve housing bore with the valve sleeve passage being in registry with one of the sleeve housing passages and with one end of the valve sleeve bore being in registry with the valve housing bore. The valve spool has first and second portions defining a valve face therebetween. The first portion of the valve spool is freely received at least in part in the valve sleeve bore and the second portion of the valve spool is received at least in part in the valve housing bore. The valve spool is reciprocal in the valve housing and valve sleeve bores with its valve face being effective to cooperate with the one end of the valve sleeve bore for controlling the communication between the valve sleeve bore and the valve housing bore.

A further feature of the invention is adapted to be embodied in a pilot-operated valve for restricting the amount of control fluid passing through the pilot or relief valve. Such a valve includes a valve member, a first port, a second port and control means on the main valve member for controlling the flow between the ports. Pressure reactive means of the main valve member defines first and second opposed pressure reactive areas. The first pressure reactive area is exposed to the pressure in the first port and means including a restrictive passage transmit fluid from the first port to the second pressure reactive area of the pressure reaction means of the main valve member. The main valve member is biased to a first position when the pressure acting on the first and second pressure reactive areas are substantially in a predetermined relationship. A pilot valve is exposed to substantially the same pressure as the pressure acting on the second pressure reactive area. The pilot valve is movable from a normally closed position to an opened position when the pressure on the second pressure reactive area exceeds a predetermined pressure for establishing a flow through the restricted passage whereby a pressure differential is established upon the pressure reactive means of the main valve member for moving the main valve member from its first position to a second position. In the aforedescribed pilot-operated valve, the invention comprises the provision of means for restricting the flow through the restricted passage in response to movement to the main valve member from its first position to its second position.

BRIEF DESCRIPTION OF THE DRAWINGS

FIGS. 1 through 5, 7 through 10 and 12 are longitudinal cross-sectional views of valve assemblies embodying this invention and made up of certain basic elements to provide differing valve function dependent on the circuit in which the valve is used:

FIG. 1 depicts a check valve.

FIG. 2 depicts another configuration of relief valve.

FIG. 3 depicts a check valve with piston override.

FIG. 4 depicts a check valve embodying a pressure breaker actuated by a piston override.

FIGS. 5 through 10 each show pilot-operated pressure control valves. These valves may perform various valve functions dependent upon the circuit in which they are used. The typical functions which may be performed by these valves are identified below:

FIG. 5 depicts a pilot operated pressure control valve.

FIG. 6 is an enlarged cross-sectional view of the valve shown in FIG. 5 taken along a different plane.

FIG. 7 depicts another configuration of a pilot-operated pressure control valve.

FIG. 8 depicts a pilot-operated pressure control valve with external pilot drain to provide either relief or sequence functions.

FIG. 9 depicts a pilot-operated counterbalance valve that provides for free reverse flow.

FIG. 10 depicts a pilot-operated sequence valve providing for free reverse flow.

FIG. 12 depicts a pilot-operated pressure control valve embodying an adjustable spool stop and pilot flow compensator.

FIG. 13 is a schematic fluid circuit embodying the valves shown in FIGS. 3, 5 and 8 through 10.

DETAILED DESCRIPTION OF THE PREFERRED EMBODIMENTS

The Basic Valve Structure

Figure 5:
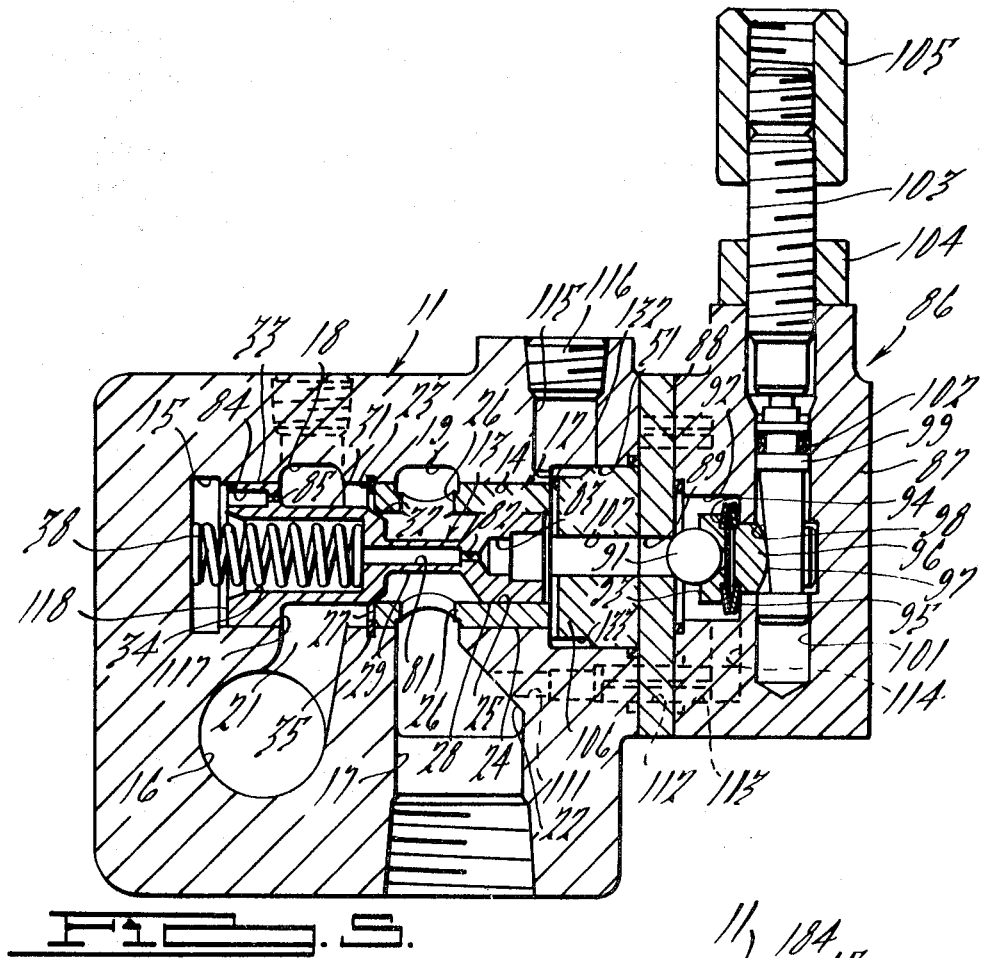

The valves shown in detail in FIGS. 1 through 12 are all made up from three basic elements comprising a valve housing 11, valve sleeve 12, and a valve spool 13. Although these elements may vary slightly in detail depending upon the function of the valve structure, certain basic elements of their construction are the same in all embodiments. This common structure will now be described without specific reference to any of the various valve embodiments, and reference may be had to any of FIGS. 1 through 12 for the following description:

The valve housing 11 is comprised of a uniform diameter valve housing bore 14 that opens generally through one face of the valve housing 11, the right-hand face in each illustrated embodiment. The opposite end of the valve housing bore 14 is blind and terminates adjacent a counterbore 15. A pair of fluid passages 16 and 17 extend into the valve housing 11 at right angles to each other. The passages 16 and 17 are connected to ports 18 and 19, respectively, by means of runners 21 and 22. The ports 18 and 19 intersect the valve housing bore 14 at points that are spaced along its longitudinal axis and which are equidistant from a snapring-receiving groove 23 for a reason which will become more apparent as this description proceeds.

The valve sleeve 12 has a cylindrical outer surface 24 that is generally complementary to the valve housing bore 14 so that the valve sleeve 12 may be slid into the valve housing bore 14 through its open end. A uniform diameter bore 25 extends through the valve sleeve 12 and is intersected by one or more generally radially extending passages 26. The passages 26 extend from the outer surface 24 into the valve sleeve bore 25 so as to provide for fluid communication, as also will become more apparent as this description proceeds. The passages 26 intersect the surface 24 at a distance from one end face 27 of the valve sleeve 12 that is equidistant to the distance between the ports 18 and 19 and the snapring-receiving groove 23 of the valve housing 11.

The valve spool 13 is comprised of a first cylindrical portion 28 that has a diameter that is complementary to the diameter of the valve sleeve bore 25 so as to permit the portion 28 of the valve spool 13 to be slidably received within the bore 25 of the valve sleeve 12. Adjacent the portion 28, the valve spool 13 is formed with a reduced diameter portion 29. The opposite end of the portion 29 is connected to a larger diameter portion 31. The portion 31 is larger in diameter than the valve sleeve bore 25 and a chamfered valve face 32 is formed between the valve spool portions 29 and 31. The valve spool portion 31 terminates adjacent a larger diameter portion 33 that has an external surface that is complementary to the valve housing bore 14 so as to permit slidable receipt therein. A bore 34 extends through the valve spool portions 33 and 31 and opens through one end of the valve spool 13. The bore 34 terminates adjacent the portion 29.

CHECK VALVES—FIGS. 1 AND 2

FIGS. 1 and 2 show two embodiments wherein the valve structure may be used as a check valve. Considering first the embodiment shown in FIG. 1, the valve sleeve 12 is positioned within the valve housing bore 14 with the passages 26 being disposed in registry with the port 19. A snapring 35 is received in the snapring groove 23 and abuttingly engages the valve sleeve end 27. The valve sleeve 12 is held axially in the valve housing bore 14 by means of a closure plug 36 that is received in a female threaded opening 37 formed at the outer end of the valve housing bore 14.

The valve spool 13 is positioned with its portion 28 slidably received in the valve sleeve bore 25. The valve spool portion 33 is slidably received in the valve housing bore 14. A coil compression spring 38 is received within the valve spool bore 34 and urges the valve face 32 into seating engagement with the valve sleeve face 27 adjacent the respective end of the valve sleeve bore 25.

In these embodiments, the basic structure of the valve spool 13 is modified by forming an enlarged passage 39 that extends through the valve spool portion 33. In addition, a compound passage 41 extends through the valve spool portion 28 from the reduced diameter portion 29 to the extreme outer end of the valve spool 13.

FIG. 1 depicts the valve assembly in a closed position. The valve may function as either a check or relief valve. As a check valve, the valve spool 13 is adapted to open when a higher pressure exists in the passage 17 then the pressure in the passage 16 to permit relatively free flow from the passage 17 to the passage 16. The higher pressure in the passage 17 is transmitted through the port 19 and passages 26 to the valve sleeve bore 25. Since the passage 41 extends through the valve spool portion 28, the pressure in the valve sleeve bore 25 will act upon the face of the valve spool adjacent the closure plug 36 and this pressure will urge the valve spool 13 to the left. Movement of the spool 13 to the left opens communication between the valve sleeve bore 25 and the valve housing bore 14. At that time, free flow will be permitted from the passage 17 to the passage 16. Due to the presence of the passage 39 through the valve spool portion 33, fluid will not be trapped on the left-hand side of the valve spool 13 to interfere with its opening.

As with all check valves, the spring 38 will act to urge the valve spool 13 to its closed position to preclude any reverse flow from the passage 16 to the passage 17. This valve may also be used as a relief valve. As such a valve, the valve spool 13 will open when a predetermined pressure is experienced in the passage 17 for relieving this pressure by establishing a flow to the passage 16.

FIG. 2 also shows a check valve, however, in this embodiment the function of the passages 17 and 16 are reversed. That is, in this embodiment when the passage 16 experiences a greater pressure than the passage 17 and upon opening of the valve spool 13 flow will take place from the passage 16 to the passage 17.

In order to achieve this reversal in the functions of the passages 16 and 17, the valve sleeve 12 is reversed from the position shown in FIG. 1 and placed in the portion of the valve housing bore 14 to the left of the snapring-receiving groove 23. The snapring 35 is then inserted to hold the valve sleeve 12 in this position. Since, as has been noted, the ports 18 and 19 are equally spaced from the groove 23 and the passages 26 are spaced a like distance from the valve sleeve end face 27, the passages 26 will register with the port 18. The valve spool 13 is inserted as shown in FIG. 2 and the spring 38 is loaded by the closure plug 36. The operation of this embodiment is believed to be readily apparent, and its description will not be repeated.

CHECK VALVE WITH PISTON OVERRIDE—FIG. 3

In this embodiment, the valve spool 13 is modified in the same manner as in the embodiment of FIGS. 1 and 2. That is, a passage formed through the valve spool portion 33 and a compound passage 41 is formed through the spool portion 28. This embodiment is unlike the preceding embodiments in that the functions of the passages 16 and 17 cannot be reversed, for a reason which will become more apparent as this description proceeds.

In this embodiment, a coil compression spring 38 is received in the valve spool bore 34 and acts against the blind end of the valve housing bore 14 to urge the valve spool 13 into engagement with the valve sleeve 12, which sleeve is positioned in the valve house 11 in the same location as the embodiment of FIG. 1.

In this embodiment, the valve housing 11 is formed with a counterbore 51 at the outer end of the bore 14. A sleeve 52 is received in the counterbore 51 and in a complementary bore 53 formed in a closure member 54. The closure member 54 is affixed to the valve housing 11 in any known manner. The sleeve 52 engages the valve sleeve 12 for axially locating the valve sleeve 12 in the valve housing bore 14.

A piston indicated generally by the reference numeral 55 is slidably supported in a bore 56 of the sleeve 52. The piston 55 has a reduced diameter portion 57 that is smaller in diameter than the diameter of the valve sleeve bore 25. Adjacent to the smaller diameter portion 57, the piston 55 has a larger diameter portion 58 that is slidably received in the bore 58 and which is provided with any suitable means for effecting a seal with this bore. The head 59 of the enlarged portion 58 is in direct fluid communication with an actuating port 61 that is formed in the closure 54.

In operation, the valve spool 13 may move between its closed position, as shown in the drawing, and an opened position. When the valve functions as a check valve, the valve spool 13 will open and permit free flow from the passage 17 to the passage 16 but will prevent reverse flow under normal conditions.

The valve spool 13 may be moved to its open position to allow free fluid communication between the passages 17 and 16 by suitably pressurizing the port 61. This pressure will cause the piston 55 to move to the left whereby its reduced diameter portion 57 will contact the valve spool portion 28. Continued movement of the piston 55 then caused the valve spool 13 to move to its opened position. This opening of the spool 13 may be accomplished to permit free reverse flow from the passage 16 to the passage 17.

As with the previously described embodiments, the valve shown in FIG. 3 may be used as a pressure relief valve. In this condition, the piston 55 may be used to open the valve and permit flow from the passage 17 to the passage 16 even though the pressure is below the normal pressure to be relieved.

CHECK VALVE WITH PRESSURE BREAKER ACTUATED BY PISTON OVERRIDE—FIG. 4

This embodiment is similar in function to the embodiment shown in FIG. 3, but a device is provided for initially reducing the pressure prior to opening of the valve spool 13. This arrangement reduces fluid pressure shocks on the system. In this embodiment, a piston 55 that is the same construction as the embodiment of FIG. 3, is employed for opening the valve, as will become more apparent as this description proceeds.

In this embodiment, a bore 71 extends cylindrically through the valve spool portion 29 and terminates at one end in the passage 41. The opposite end of the bore 71 is counterbored, as at 72, which counterbore intersects the valve spool bore 34. A plurality of radially extending passages 73 are formed in the valve spool portion 29 and intersect the counterbore 72.

A plunger rod 74 is slidably supported in the bore 71 and has sufficient length so as to extend beyond the right-hand side of the valve spool 13. The plunger rod 74 is, however, normally spaced from the piston portion 57. The opposite end of the plunger rod 74 extends through the counterbore 72 and contacts a ball valve 75. The ball valve 75 is received in a cup 76 that has an adjacent flange 77 which is engaged by the spring 38. The spring 38 encircles the cup 76 and normally exerts a bias through the cup 76 on the valve ball 75 and upon the valve spool 13 for urging both of these elements to their closed position as shown in FIG. 4.

As in the previously described embodiments, the valve may function as either a check or a relief valve. The operation under each of these functions is believed to be readily apparent and will not be described in detail.

If it is desired to operate the valve by means of the piston 55, the port 61 is again pressurized. This pressure will cause the piston 55 to move to the left and then the plunger 74 will be contacted prior to contact of the piston portion 57 with the valve spool 13. Hence, the ball valve 75 will be unseated and will permit flow between the passages 17 and 16 via their passages 73, the gap between the plunger rod 74 and counterbore 72, the valve spool bore 34 and the passage 39. The opening of the valve ball 75 will reduce the higher pressure that may exist and upon continued movement of the piston 55 the valve spool 13 will be opened and substantially unrestricted flow is permitted between the passages 17 and 16. However, since the initial high-pressure condition has been reduced to some extent, pressure shocks on the system will be reduced.

PILOT-OPERATED PRESSURE CONTROL VALVES—FIGS. 5-7

In these embodiments, the valve housing 11 is of the same construction as in the embodiments of FIGS. 3 and 4. That is, the counterbore 51 is formed at the right-hand side of the valve housing bore 14 and opens through its outer face. The valve spool 13 is modified from the previously described embodiments in that a bore 81 is formed in its portion 29 and extends from the bore 34 to a reduced diameter portion 82 formed in its portion 28. A counterbored passage 83 extends through the remainder of the valve spool portion 28 and terminates at its right-hand face, which is in communication with the counterbore 51 of the valve housing 11. In addition, a passage 84 extends through the valve spool portion 33 and has a restriction 85 at one of its ends.

A pilot valve assembly, indicated generally by the reference numeral 86 is disposed at the right-hand side of the valve housing 11. The pilot valve assembly 86 is generally of the type shown in FIG. 3 of my copending patent application entitled "Fluid Valve," Ser. No. 827,506, filed May 26, 1969, which application is a continuation in part of my copending application of the same title, Ser. No. 664,756, filed Aug. 31, 1967.

The pilot valve 86 is comprised of a valve housing 87 and valve plate 88 that are affixed in any suitable manner to the face of the valve housing 11 adjacent counterbore 51. The plate 88 is formed with a central aperture 89 and a ball-type valve 91 controls the flow through the aperture 89 in a manner which will become more apparent as this description proceeds. The valve 91 is received in a bore 92 that extends through one face of the pilot valve housing 87. The ball valve 91 is supported in a cuplike member 93 that is received in the central opening of a first, annular Belleville spring 94. A second Belleville spring 95 engages the outer end of the first Belleville spring 94 and received a cam follower 96 in its central aperture.

The cam follower 96 has a curved surface 97 that engages an inclined surface 98 formed on an adjusting plunger 99. The adjusting plunger 99 is slidably supported in a cylindrical bore 101 that is formed in the pilot valve housing 87 and which extends perpendicularly to the bore 92. A O-ring seal 102 is received around the upper end of the plunger 99 for effecting a fluidtight seal. An adjusting screw 103 is connected to its lower end in any suitable manner to the plunger 99 and is threadingly received in a female threaded member 104 that is affixed to the pilot valve housing 87 at the upper end of the bore 101. A knob 105 is affixed to the opposite end of the adjusting screw so as to facilitate its adjustment.

Figure 6:
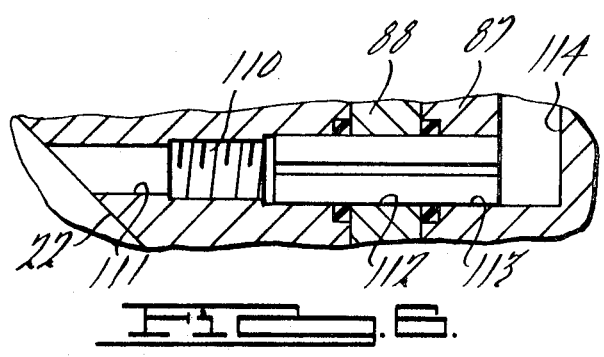

The construction described above in connection with this embodiment is common to both the embodiments of FIGS. 5 and 6 and the embodiment of FIG. 7. Considering now specifically the embodiment of FIGS. 5 and 6, the pilot-operated pressure control valve is intended to operate when the pressure in the passage 16 is normally greater than the pressure in the passage 17. The valve spool 13 will open when the pressure in the passage 16 reaches a predetermined value. The valve structure in this embodiment further includes an annular spacer 106 that is received in the valve housing bore 51 and which has a central passage 107 that extends from the valve housing bore 14 to the aperture 89 in the pilot valve plate 88. The spacer 106 engages the valve sleeve 12 and holds it axially in place through cooperation with the snapring 35.

A pilot valve discharge passage 111 (FIG. 6) extends through the valve housing 11 from the passage 17. The passage 111 is formed with a threaded portion 110, for a reason which will become more apparent as this description proceeds, and mates with a complementary passage 112 in the pilot valve plate 88 and with a corresponding passage 113 that is drilled in the pilot valve housing 87. The passage 113 is intersected by a passage 114 which, in turn, intersects the bore 92 at its other end.

A passage 115 is formed in the valve housing 11 and intersects the counterbore 51 at its inner end. The passage 115 may function to connect the valve to some form of external control, as will become more apparent as this description proceeds. The passage 115, however, serves no purpose in this embodiment and, for this reason, is closed by a plug 116 at its outer end.

The operation of the embodiment shown in FIGS. 5 and 6 is as follows: If the pressure in the passage 16 is not greater than the desired pressure, the valve spool 13 will be urged to its closed position by the spring 38 as in the previously described embodiments. The pressure in the passage 16 is exerted upon an area 117 formed on the side of the valve spool portion 33 adjacent the portion 31. This area may be considered a first pressure reactive area and the portion 33 may be considered a pressure reactive means of the valve spool in this embodiment. The pressure in the passage 16 is also transmitted to a second pressure responsive area 118 formed on the opposite side of the valve spool portion 33 through the passage 84 and restricted portion 85. The effective area on the pressure responsive area 118 is equal to that of the area 117 and the bias of the spring 38 will normally hold the valve spool 13 in its closed position. The spring 38 can be relatively light and need only provide a seating pressure on the valve spool 13.

The pressure on the valve spool area 118 is also transmitted through the bore 34 and passages 81, 82 and 83 of the valve spool 13, and through the passages 107 and aperture 89 onto the ball valve 91. The Belleville springs 94 and 95 are preloaded an amount depending upon the axial position of the cam surface 98 which is adjusted by rotating the screw 103. As long as the preset pressure is not exceeded, the ball valve 91 will be maintained in a closed position.

Assuming now that the pressure in the passage 16 exceeds the desired pressure, the ball valve 91 of the pilot valve assembly 86 will become unseated by compression of the Belleville springs 94 and 95. A flow is then established through the aperture 89, bore 92 and passages 114, 113, 112 and 111 to the passage 117. The control fluid so flowing is discharged from the passage 16 and due to the restriction 85, a pressure drop will be experienced across the passage 84. Thus, under this dynamic condition the pressure on the reactive area 117 will exceed the pressure on the reactive area 118 and this pressure will shift the valve spool 13 to the left as viewed in FIG. 5. When this occurs, the passage 16 will be in open communication with the passage 17 and flow will be experienced until the pressure in the passage 16 again falls below the desired pressure at which time the valve will close in a manner which is believed to be apparent.

Under some conditions it may be desired to open the valve spool 13 to relieve the pressure in the passage 16 even though the pressure in the passage 16 is not sufficient to operate the pilot valve assembly 86. This opening may be accomplished by connecting the passage 115 to a lower pressure area such as the sump via a two-way valve. Of course, when this is done the plug 116 must be remove. When the passage 115 is opened directly to sump pressure, a flow will be induced through the passage 84 and because of the restriction 85 an unbalanced pressure condition will again be experienced on the valve spool 13. The valve spool 13 will then open and provide for full flow from the passage 16 to the passage 17. In order to insure the flow of control fluid through the passage 84, bore 34 and passages 81, 82 and 83, the spacer member 106 is provided with radially extending grooves 132 that communicate with an annular recess 133 formed on the outer surface of the spacer member. Control fluid may flow through these areas to the passage 115 and thence to the sump.

In addition to using the passage 115 for connecting the valve to an external two-way valve, the passage 115 may be used to provide a connection to a remotely operated pilot valve (not shown). Such remote two-way valves or pilot valves may be used alone or in conjunction with the pilot valve assembly 86. If two pilot valve assemblies are employed, each will normally be set to open at a different pressure.

The embodiment shown in FIG. 7 is substantially the same as the embodiment shown in FIGS. 5 and 6, but in this case the functions of the ports 17 and 16 are reversed. That is, in this embodiment the passage 17 is normally at a higher pressure than the passage 16. When a predetermined pressure in the passage 17 is exceeded, the valve spool 13 will open and provide for communication between the passages 17 and 16.

In order to achieve this reversal, the only changes necessary are to position the valve sleeve 12 on the side of the snapring 35 opposite to that of the embodiment of FIGS. 5 and 6. The passages 29 in this valve sleeve then register with the port 18. In addition, the valve spool 13 is reversed in position and the spring 38 is loaded against the spacer 106. In addition, the passage 112 for the control fluid mates with a passage 131 formed in the valve housing 11 which passage extends to the passage 16. The operation of this embodiment is the same as that previously described and it is not believed necessary to repeat the description of this operation.

PILOT-OPERATED SEQUENCE VALVE—FIG. 8

This valve is substantially the same in construction as the embodiment shown in FIGS. 5 and 6. In this embodiment, however, the passage 17 may at times experience a relatively high pressure and for this reason, the pilot valve assembly 86 when opened does not discharge into the passage 17. Rather, a passage 151 is formed in the pilot valve housing 87 at the base of the bore 101. This passage may be connected by any suitable conduit to a low-pressure area such as the sump. The passage 112 in the pilot valve plate 88 may be deleted since blockage of the passage 111 is accomplished by a plug 150 threaded into the tapped opening 110.

The external drain 151 for the pilot valve assembly 86 may be useful, in addition to the aforenoted condition, if there are relatively large flow restrictions, such as filters or the like downstream of the passage 17. Such devices might produce too large a flow restriction for the control fluid flowing through the pilot valve assembly 86.

The operation of this embodiment is the same as in the previously described embodiment except that the control fluid that flows through the pilot valve assembly 86 is discharged through the passage 151 to the low-pressure source. Further description of this operation is not believed to be necessary. In addition, as with the embodiment in FIGS. 5 and 6, the functions of the two passages 16 and 17 may be reversed in the same manner as was done to achieve the embodiment of FIG. 7.

PILOT-OPERATED COUNTERBALANCE VALVE WITH

FREE REVERSE FLOW—FIG. 9

This valve is substantially the same as the embodiment shown in FIGS. 5 and 6, but a means is provided for permitting free reverse flow from the passage 17 through the passage 16. To achieve this embodiment, the components used in the embodiment of FIG. 5 (the pilot valve assembly 86, main valve housing 11, valve sleeve 12, and valve spool 13) are employed. A piston operator of the type shown in FIG. 3, however, is also employed. Inasmuch as substantially all of the individual components have already been described, only such additional description of these components will be given as to make the operation clear.

In this embodiment, the sleeve 52 is positioned in the valve housing counterbore 51 and the internal bore 56 of the sleeve slidably supports the piston 55. The sleeve 52 is also supported in a bore 161 of a spacer 162. The spacer member 162 is interposed between the valve housing 11 and the pilot valve plate 88. These components are secured together in any known manner. The passage for returning the control fluid from the pilot valve assembly 86 to the passage 17 includes a passage 163 that is drilled through the spacer member 162. The passage 163 is aligned with the passage 111 of the valve housing assembly 11 and the passage 112 of the pilot valve plate 88.

The piston 55 may be actuated by hydraulic pressure from one of two sources. If it is desired to provide free reverse flow in response to a high-pressure condition in the passage 17, a passage 164 may be provided in the spacer member 162 extending from the right-hand side of the bore 161 and intersecting the passage 163. The outer end of the passage 164 is closed by a plug or the like.

If it is desired to operate the piston 55 from some other pressure source, a passage 160 may be formed in the spacer member 162 which passage also intersects the bore 161. In this event the passage 164 will be closed by a plug. Normally, the passage 160 will be closed by means of a plug (not shown).

A passage, indicated schematically at 165 interconnects an annular area 166 formed by a recess at one end of the sleeve 52 with the aperture 89 of the pilot valve plate 88. Control fluid may flow into the annular area 166 through radially extending reliefs 167 formed at the forward end of the sleeve 52.

Figure 9:
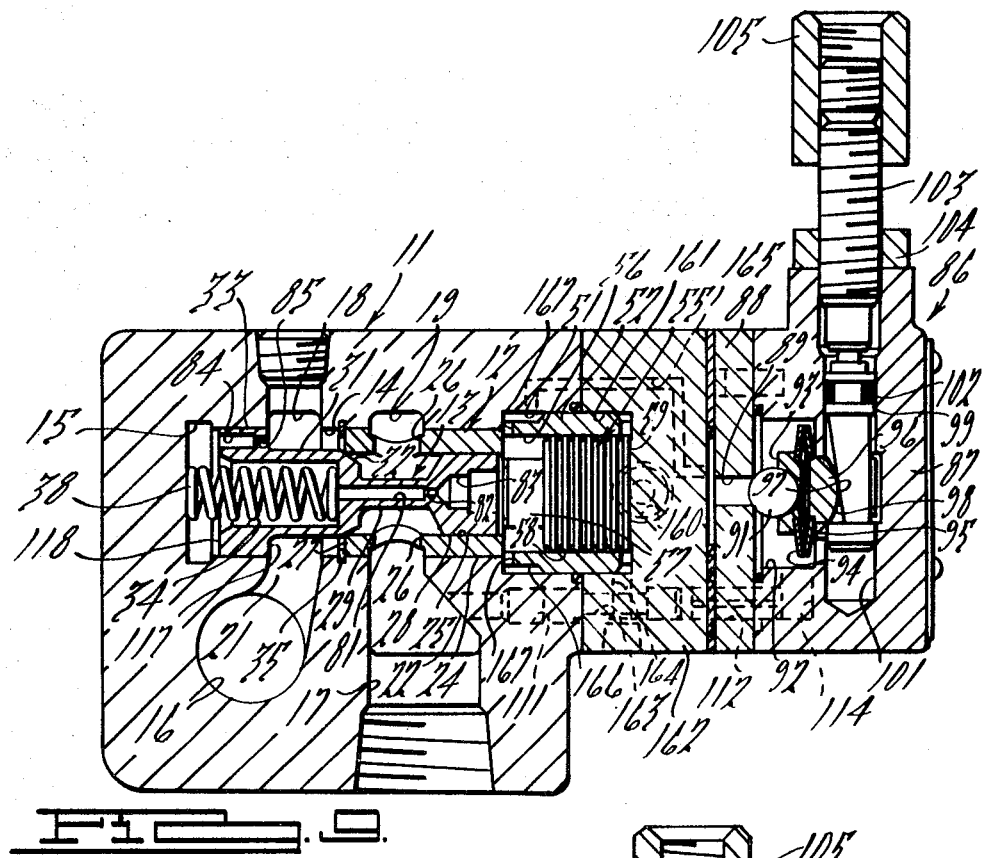

FIG. 9 illustrates the valve assembly in its closed position. In this condition, the pressure in the passage 116 is exerted on both pressure reactive areas 117 and 118 of the valve spool 13 and as has already been described, the valve spool 13 will be maintained in a closed position unless the predetermined pressure in the passage 16 is exceeded. The pressure thus acting also is exerted upon the left-hand side of the piston 55 through the bore 34 and passages 81, 82 and 83 of the valve spool 13. When the predetermined pressure, as set by adjusting the inclined surface 98 of the pilot valve assembly 86 is exceeded, the ball valve 91 will open to upset the pressure balance on the valve spool 13. The valve spool 13 will then open affording direct communication between the passages 16 and 17 in the manner which has already been described.

In the event the pressure in the passage 17 exceeds the pressure in the passage 16, the pressure in the passage 17 will be transmitted to the right-hand side of the piston 55 through the passages 111, 163 and 164. If sufficient pressure is experienced, the piston 55 will be shifted to the left and the piston portion 57 will contact the valve spool portion 28 and urge the valve spool 13 to an opened position. As has been previously noted, the valve spool 13 may be fixed to an open position by applying suitable pressure to the piston 55 through the passage 160.

PILOT-OPERATED SEQUENCE VALVE WITH FREE REVERSE FLOW—FIG. 10

This valve is structurally similar to the valve shown in FIG. 9 but serves a slightly different function. The relationship of this embodiment to the embodiment shown in FIG. 9 is the same as the relationship of the embodiment of FIG. 8 to the embodiment of FIG. 5. Thus, in order to modify the valve shown in FIG. 9 to accomplish the sequencing function, this valve is changed in the same way as the valve of FIG. 5 was changed to achieve the embodiment of FIG. 8. Specifically the return for the control fluid from the pilot valve assembly 86 to the passage 17 is closed by inserting a plug 150 in the tapped opening 110. A pilot valve housing 87 is employed that has a passage 151 formed at the base of the bore 101, which passage is connected to a suitable low-pressure area such as the sump.

The operation of the embodiment shown in FIG. 10 during the sequencing cycle is the same as the operation of the embodiment of FIG. 8 and will not be described again in detail. Briefly, when the pressure in the passage 16 exceeds the predetermined pressure control, fluid flows through the pilot valve assembly 86 and back to the low-pressure area through the passage 151. At this time, the balance on the valve spool 13 is upset and it will open.

In the event the pressure in the passage 17 exceeds the pressure in the passage 16, the pressure in the passage 17 will be transmitted to the right-hand side of the piston 55 through the passages 111, 163 and 164. As with the previously described embodiment, free flow between the passages 17 and the passage 16 may be provided by suitably pressurizing the passage 160.

PILOT FLOW COMPENSATOR—FIG. 11

In all of the previously described embodiments that incorporated a pilot valve, a certain amount of control fluid was discharged through the pilot valve assembly 86. When used in connection with a sequencing operation, this control fluid accomplishes no useful work. It is desirable, therefore, to minimize the amount of fluid so lost. This cannot be conveniently done by increasing the restriction of the passage 84 since this would adversely affect the operation of the pilot valve. In order to reduce the amount of control fluid lost under the condition of full opening of the valve spool 13, a pilot flow compensator indicated generally by the reference numeral 181 is provided. The pilot flow compensator 181 is positioned in the valve housing counterbore 15 and has a generally annular shape. A first, larger diameter portion 182 is juxtaposed to the blind end of the counterbore 15. An O-ring seal 183 encircles the portion 182 and is loaded against the wall of the valve housing 11 by means of an annular projection 184 formed on the pilot flow compensator 181. The pilot flow compensator 181 has a reduced diameter portion 185 that is encircled by the spring 38, which spring holds the O-ring seal 181 in a state of compression. A central bore 186 extends through the pilot flow compensator 181 so that no fluid will be trapped on the left-hand side of the compensator. It will be noted that the pilot flow compensator 181 is self-centering in that it is supported only the spring 38.

In operation, as the valve spool 13 moves to the left as viewed in this figure to its fully opened position, its pressure reactive area 118 will be juxtaposed to the pilot flow compensator 181. A relief 187 formed adjacent the end of the bore 34 will form a restricted annular passage through which the control fluid that passes through the pilot valve assembly 86 must flow. The insertion of this restriction in the control fluid line will reduce the amount of control fluid that is lost to the system. This restriction, however, only occurs when the valve spool 13 is fully opened and thus the operation of a pilot valve 86 is not adversely affected. The pilot flow compensator also is useful when a two-way valve is used in conjunction with the passage 115 and when there is a relatively large restriction in the conduit downstream in the passage 17. Under these conditions the pilot flow compensator will be useful to reduce the lag in the closing of the valve spool 13.

ADJUSTABLE POSITION STOP—FIG. 12

Figure 11:
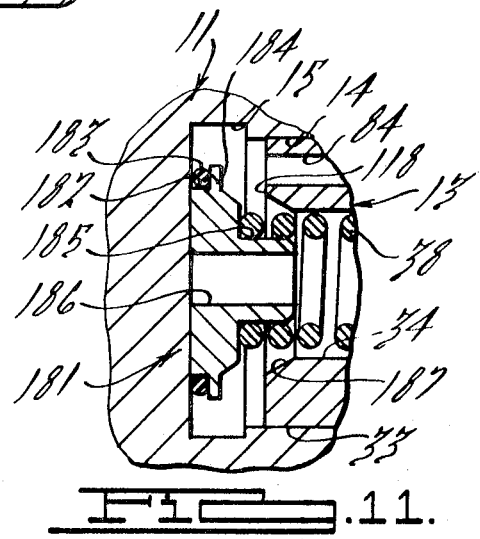
FIG. 11 depicts a pilot flow compensator that may be used with the valves shown in FIGS. 5 through 7 through 10.
Figure 12:
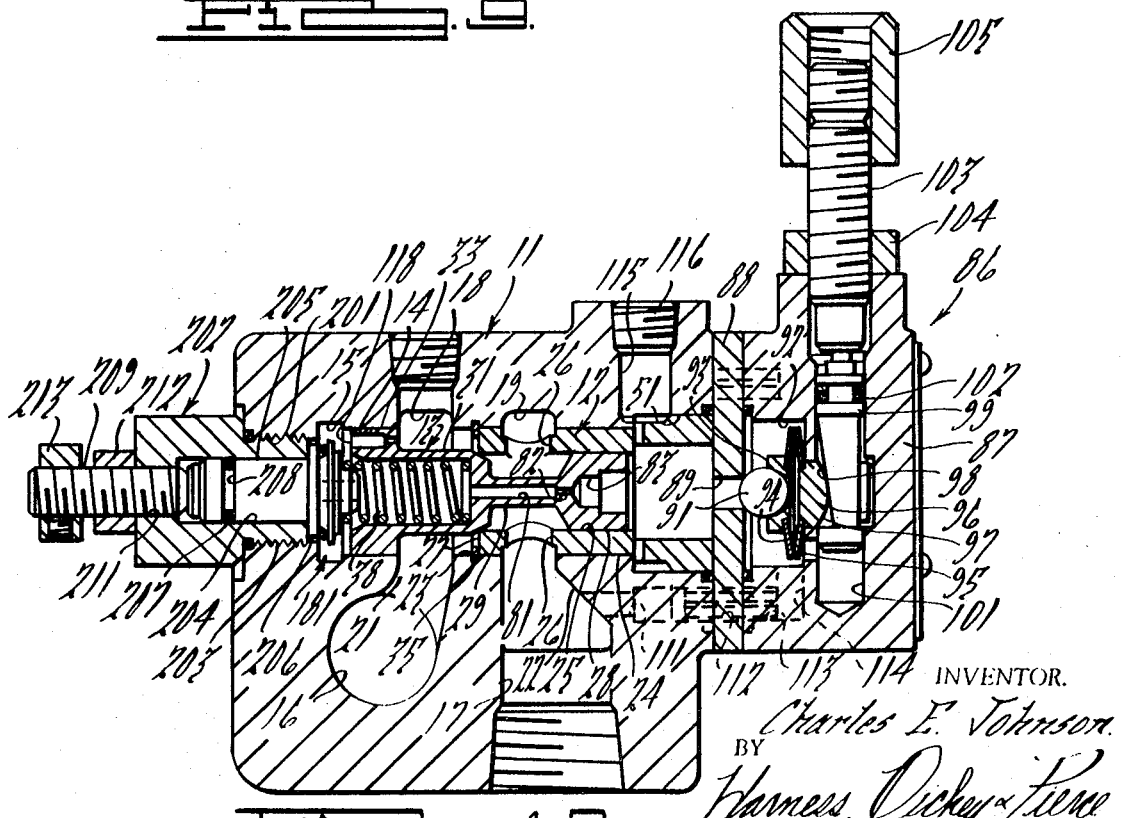

In certain of the previously described embodiments that employed pilot valve assemblies, provision was made for bypassing the operation of the pilot valve and dumping control fluid directly to a low-pressure source for opening the valve spool 13. Such an arrangement was described in connection with the embodiment of FIG. 5 wherein the main valve spool 13 was opened by venting the passage 115 to a low-pressure source. When this is done, the preload of the spring 38 will determine the pressure at which the valve spool 13 opens. An embodiment will now be described wherein a means for adjusting this preload is provided by particular reference to FIG. 12. The valve shown in FIG. 12 also provides a structure for adjusting the amount of opening of the valve spool 13. This is particularly useful in limiting of the stroke of the spool 13 permitting more rapid closing of the spool 13. The valve assembly shown in FIG. 12 is substantially the same as that shown in FIG. 5, except as it will be hereinafter described. In this embodiment, the pilot flow compensator 181, as shown in FIG. 11, is also incorporated and this pilot flow will not be described again in detail.

The portion of the valve housing 11 at the normally blind end of the bore 14 and the counterbore 15 is provided with a tapped opening 201. A fitting 202 has a male threaded portion 203 that is threaded into the tapped opening 201. The fitting 202 has an internal bore 204 at which a plunger 205 is slidably received. The plunger 205 has an enlarged portion 206 that is juxtaposed to the pilot flow compensator 181 and against which the compensator is urged by the spring 38. An O-ring seal 207 is received in a circular groove 208 of the plunger 205 to sealingly engage the fitting 202.

The axial position of the plunger 205 is adjusted by means of an adjustment screw 209 that is received in a threaded bore 211 formed at the outer end of the bore 204. A jamb nut 212 is provided for axially fixing the adjusting screw 209 and a knob 213 is provided on the outer end of the screw 209 for facilitating adjustment.

It should be readily apparent that axial movement of the adjusting screw 209 and plunger 205 will move the pilot flow compensator 181 and limit the amount of movement that the valve spool 13 may experience. By reducing the degree of movement of the valve spool 13, the speed of closing of the valve spool can be accelerated. The change in position of the pilot flow compensator 181 also alters the preload on the spring 38 and will permit some degree of adjustment in the pressure at which the valve will open. In all other respects this embodiment is the same as the embodiment of FIG. 5 and the pilot flow compensator 181 will operate as described in connection with FIG. 11.

APPLICATION OF THE VALVES TO A HYDRAULIC CIRCUIT—FIG. 13

In describing each of the valve embodiments, it was assumed that those skilled in the art would be able to appreciate the various possible uses. For the sake of clarity, however, a typical hydraulic circuit in which certain of these valve embodiments may be used is shown in FIG. 13 and will now be described. For the ease of illustration, the various valve embodiments have been depicted in FIG. 13 in a schematic manner and the pilot-operated pressure control valve of FIG. 5 has been identified generally by the reference character "A", the check valve with piston override of FIG. 3 has been identified by the reference character "B", the pilot-operated sequence valve with free reverse flow of FIG. 10 has been identified by the reference character "C", the pilot-operated counterbalance valve with reverse flow of FIG. 9 has been identified by the reference character "D", and the pilot operated sequence valve of FIG. 8 has been identified by the reference character "E". In each case the reference numerals applied to the different valve embodiments have had the aforenoted reference characters added as suffixes.

The hydraulic circuit in FIG. 13 may be used in connection with a plastic injection molding arrangement incorporating a cylinder 251 for opening and closing the injection molding dies (not shown), an injection cylinder 252 for injecting a plastic pellet into the closed dies and a fluid-operated motor 253 for driving pellets of plastic to the injection cylinder 252. The circuit also includes a main hydraulic pump 254 that is driven by an electric motor 255 and a main control valve 256. The main motor 254 draws hydraulic fluid from a sump 257 through a filter 258 and inlet line 259. The high-pressure fluid is delivered from the pump 254 to the main control valve 256 via a high-pressure conduit 261. A pressure relief line 262 connects the high-pressure line 261 with the passage 16A of the pilot-operated pressure control valve A (FIG. 5). The passage 17A of this valve is connected back to the sump 257 by means of a conduit 263. It should be readily apparent to those skilled in this art that the pilot-operated pressure control valve A will maintain a pressure in the high-pressure conduit 261 as determined by the setting of its pilot valve 86A.

The main control valve 256 is of the three position solenoid-controlled type. In one position of the valve 256, corresponding to the injection cycle, the main conduit 261 is positioned in fluid communication with a conduit 264 and a second conduit 265 is placed in communication with the sump 257 via a conduit 266. This position is established when the main valve spool shifted to the right as viewed in this figure. When the spool of the main valve 256 is shifted to the left from the position as shown in this figure, the main conduit 261 is placed in communication with the conduit 265 and the conduit 264 is vented to the sump 257. In the neutral position of the spool of the main valve 256, fluid from the pump 254 is directly returned to the sump 257.

The conduit 264 is connected to the passage 17B of the check valve with piston override B (FIG. 3) that operates as a check valve in this embodiment, by a conduit 267. The conduit 264 is also connected to the passage 16C of the pilot operated sequence valve C (FIG. 10) by a conduit 268. The passage 16B of the check valve with piston override B is connected to one side of the die-operating cylinder 251 by a conduit 269. The other side of the die-operating cylinder 251 is connected to the conduit 265 by a conduit 271. The conduit 271 is also connected to the passage 61B of the check valve with piston override B as indicated by the broken line 272.

The passage 17C of the pilot-operated sequence valve with free reverse flow C (FIG. 10) is connected to one side of the injection cylinder 251 by means of a conduit 273. The opposite side of the injection cylinder 252 is connected to the passage 16D of the pilot-operated counterbalance valve with free reverse flow D (FIG. 9) by a conduit 274.

The passage 17D of counterbalance valve D is connected to the conduits 265 and 271 by a conduit 275. The conduit 275 is also connected to the passage 16E of the pilot-operated sequence valve E (FIG. 8) by a conduit 276. The passage 17E of the sequence valve E is connected to the fluid motor 253 by a conduit 277 in which a speed control in the form of a variable flow valve 278 is interposed.

In operation, FIG. 13 illustrates the system in a condition wherein the dies are opened by the die-operating cylinder 251, and the injection cylinder 252 is in its retracted position. A pellet of plastic will have been delivered to the injection cylinder 252 by the motor 253, as will become more apparent as this description proceeds. To initiate the operation cycle, the valve spool of the main valve 256 is shifted to the right so that the conduit 264 experiences the main line pressure in the conduit 261, which as has been noted is established by the pilot-operated pressure control valve A. This pressure is transmitted through conduits 267 and 268. The sequence valve C, and particularly its valve spool 13C, will be maintained in a closed position until a predetermined pressure is experienced in the passage 16C. The pressure in the conduit 264 is transmitted through the conduit 267 to the passage 17B of the check valve with piston override B. The spring 38 of this check valve is set to open at a pressure that is lower than the pressure required to operate the spool 13C of the pilot-operated sequence valve with free reverse flow C. The spool 13B of the check valve with piston override B will then open to establish communication between the conduits 267 and the conduit 269. The operating cylinder 251 is then moved to the end of its stroke and fluid is exhausted by this operation through the conduit 271. This fluid is returned to the sump via the conduit 265, main valve 256 and conduit 266. At this time, there will be a relatively low pressure in the conduit 272 and passage 61B. Hence, the piston 55B will be maintained in an inactive condition.

When the die-operating cylinder 251 reaches the end of its stroke and the dies are closed, a pressure rise will be experienced in the conduit 267. This increased pressure is transmitted through the conduit 268 to the passage 16C of the pilot-operated sequence valve C. When the pressure rises sufficiently, the pilot valve assembly 86C will open and exhaust control fluid to the sump 257 through the passage 151C. At this time, the main valve spool 13C will open and establish communication between the passages 16C and 17C. Fluid will then be delivered through the conduit 273 to the injection cylinder 252 and will cause the injection cylinder to commence its injection stroke.

When fluid pressure is delivered to one side of the injection cylinder 252, fluid will tend to be exhausted from the other side through the conduit 274. This gives rise to a pressure increase in this conduit which is transmitted to the passage 16D of the pilot-operated counterbalance valve D. The setting of its pilot valve assembly 86D will determine the pressure at which fluid is expelled from the injection cylinder 252 and this pressure is sufficient to equal the weight of the piston and associated elements of this cylinder. Thus, the only force exerted by the cylinder 252 is the hydraulic force exerted upon it by the conduit 273.

The fluid that is discharged from the injection cylinder 252 through the conduit 274 and through the counterbalance valve D is returned to the sump via the passage 17D and the conduit 275. This pressure, which is substantially equal to sump pressure, is exerted on the conduit 276 but is insufficient to cause opening of the sequence valve E. From the foregoing description, it should be readily apparent that upon actuating of the main control valve 266 the dies are first closed through operation of the die-operating cylinder 251 and when the dies are fully closed a slug of plastic is injected into the dies by the operation of the injection cylinder 252. After this action has occurred, the spool of the main control valve 256 is shifted to its extreme left-hand position so that the conduit 265 is exposed to the pressure in the high-pressure conduit 261 and the conduit 264 is exposed to the sump through the conduit 266.

The pressure in the conduit 265 is delivered to the die-operating cylinder 251 to again open the dies, to the injection cylinder 252 to retract it and to the injection motor 253 to deliver another pellet of plastic to the injection cylinder 252. The die-operating cylinder 251 and injection cylinder 252 are operated first in a manner which will now be described.

When the conduit 265 is pressurized, this pressure will be experienced in the conduit 271 and will act on the die-operating cylinder 251 in a direction that causes the dies to open. The pressure in the conduit 271 is transmitted to the piston 55B of the check valve with piston override through the conduit indicated schematically at 272. The piston 55B is shifted to the left (FIG. 3) and opens the valve spool 13B. This permits fluid to flow from the other side of the cylinder 251 through the conduit 269, passages 16B and 17B and conduit 267. This fluid is returned to the sump through the conduit 264, main valve 256, and conduit 266.

At the time the die-operating cylinder 251 is opening the dies, high pressure is also experienced in the conduit 275. This pressure acts upon the passage 17D of the pilot-operated counterbalance valve D and, also, is transmitted through the passage 164D to the right-hand side of its piston 55. This pressure causes the valve spool 13D to be shifted to the opened position so that fluid under pressure may flow to the passage 16D and thence through the conduit 274 to the injection cylinder 252. Pressure in this direction causes the injection cylinder to retract, and fluid is driven from the other side of the injection cylinder piston through the conduit 273. The fluid flowing through the conduit 273 acts on the passages 17C of the sequence valve C and is transmitted through the passage 164C to its piston 55C. This pressure acting on the piston causes the valve spool 13C to open and the fluid from the injection cylinder is returned to the sump through the passage 16C, conduit 268, conduit 264, main valve 256 and conduit 266.

During retraction of the cylinders 251 and 252 there is insufficient pressure in the conduit 276 to cause the sequence valve E to operate. When the cylinders 251 and 252 are at the ends of their strokes, however, there will be sufficient pressure exerted upon the pilot valve assembly 86E to cause the valve spool 13E to open. The control fluid that flows through the pilot valve assembly E is, as previously noted, returned to the sump 257 from the passage 151E. When the valve spool 13E opens, communication is established between the passages 16E and 17E and fluid will be delivered to the fluid motor 253 through the conduit 277 at a rate determined by the setting of the valve 278. Operation of the fluid motor 253, as has been noted, is effective to deliver another pellet of plastic to the injection cylinder 252 and at that time the main valve 256 is again returned to its neutral position and the system is ready for repeating the aforedescribed cycle.

What is claimed is:

1. A valve assembly comprised of at least three elements adapted to be assembled in a variety of relationships for serving different functions, said three elements comprising a valve housing, a valve sleeve, and a valve spool, said valve housing defining a bore and a pair of passages intersecting said valve housing bore at locations spaced along the axis of said valve housing bore, said valve sleeve having an external surface complimentary to said valve housing bore, a bore extending at least in part therethrough and a passage extending from said external surface to said valve sleeve bore, said valve sleeve being received at least in part in said valve housing bore with said valve sleeve passage being in registry with one of said valve housing passages and one end of said valve sleeve bore being in register with said valve housing bore, said valve spool having first and second portions defining a valve face therebetween, said first portion of said valve spool being freely received at least in part in said valve sleeve bore, said second portion of said valve spool being received at least in part in said valve housing bore, said valve spool being reciprocable in said valve housing and valve sleeve bores with the valve face being effective to cooperate with said one end of said valve sleeve bore for controlling the communication between said valve spool bore and said valve housing bore.

2. A valve assembly as set forth in claim 1 wherein the valve spool has a third portion received within and slidably supported by the valve sleeve bore.

3. A valve assembly as set forth in claim 1 wherein the valve spool has a fourth portion received within and slidably supported by the valve housing bore.

4. A valve assembly as set forth in claim 3 wherein the valve spool has a third portion received within and slidably supported by the valve sleeve bore.

5. A valve assembly as set forth in claim 1 wherein the valve housing ports are located equidistant from but on opposite sides of a plane extending perpendicular to the valve housing bore, the one end of the valve sleeve being juxtaposed to said plane.

6. A valve assembly as set forth in claim 5 wherein the valve sleeve port is spaced at the same distance from its one end as the distance between the valve housing ports and the plane for reversal of the valve sleeve within the valve housing bore.

7. A valve assembly as depends on claim 6 further including means carried by the valve housing and cooperating with the ends of the valve sleeve for axially affixing said valve sleeve within said valve housing bore.

8. A valve assembly as set forth in claim 5 wherein one end of the valve housing bore is blind and the other end of said valve housing bore opens through one end face of the valve housing and further including closure means for closing the open end of said valve housing bore.

9. A valve assembly as depends on claim 8 wherein the valve sleeve port is spaced at the same distance from its one end as the distance between the valve housing ports and the plane for reversal of the valve sleeve within the valve housing bore.

10. A valve assembly as set forth in claim 1 further including a bore formed in the first portion of the valve spool and a spring received in said bore and being compressed between its ends by said valve spool and the valve housing for urging the valve spool toward a closed position.

11. A valve assembly as set forth in claim 10 further including a fourth portion formed on the valve spool slidably received in the valve housing bore for slidably supporting the said valve spool therein.

12. A valve assembly as set forth in claim 11 further including fluid passage means extending through the fourth portion of the valve spool for equalizing the pressure on opposite sides of the fourth portion of the valve spool.

13. A valve assembly as set forth in claim 1 and adapted to provide for communication between the valve housing passages at a predetermined pressure differential, the valve spool having a third portion received within and slidably supported by the valve sleeve bore and a fourth portion received within and slidably supported by the valve housing bore, said valve spool further having a bore formed therein and extending through one end thereof within its second and fourth portions, coil spring means received within said valve spool bore and urging the valve face of said valve spool toward the one end of the valve sleeve.

14. A valve assembly as set forth in claim 13 wherein the valve housing bore is a blind bore and opens through one end of the valve housing, the passages in said valve housing being spaced equal distances from a plane extending normal to said valve housing bore, the valve sleeve being received within the portion of said valve housing bore extending between said plane and said open end, the coil spring being engaged at one of its ends with the blind end of said valve housing bore, and further including a closure plug received within said open end of said valve housing bore and engaging said valve sleeve for closing said valve housing bore and for holding said valve sleeve within said valve housing bore.

15. A valve assembly as set forth in claim 13 wherein the valve housing bore is a blind bore and opens through one end of the valve housing, the passages in said valve housing being spaced equal distances from a plane extending normal to said valve housing bore, the valve sleeve being received within the portion of said valve housing bore extending between said plane and the blind end, and a closure plug received within said open end of said valve housing bore for closing said valve housing bore, the coil spring being engaged at one of its ends with said closure plug of said valve housing bore.

16. A valve assembly as set forth in claim 13 further including a pilot operator for actuating the valve spool, said pilot operator comprising a pilot piston, said pilot piston having a first position adapted to engage said valve spool and a second cylindrical portion, means defining a bore for slidably supporting said second portion of said pilot piston concentrically with the valve housing bore, and means for pressurizing one side of said pilot piston for bringing said pilot piston into actuating engagement with said valve spool.

17. A valve assembly as set forth in claim 16 wherein the bore for the pilot piston is defined by a sleeve, a counterbore formed at one end of the valve housing bore and receiving said sleeve.

18. A valve assembly as set forth in claim 16 further including a pressure-breaking passage extending through the valve spool from its first portion to its second portion for providing for fluid communication between the housing passages, a valve element for controlling the flow through said valve spool passage, and actuator for moving said valve element from a closed position to an open position, the first portion of the pilot piston being adapted to engage and operate said valve actuator for opening said valve element prior to opening of said valve spool.

19. A valve assembly as set forth in claim 1 adapted to operate as a pilot-controlled valve, and further including a pilot valve assembly, said pilot valve assembly including a pilot valve element adapted to open at a predetermined pressure, the valve spool having a third portion received within and slidably supported by the valve sleeve bore and a fourth portion received within and slidably supported by the valve housing bore, said fourth portion defining opposed pressure reactive areas the first of which is exposed to the pressure in one of the valve housing passages, a restricted passage extending through said fourth portion for transmitting the fluid pressure from said first pressure reactive area to the second pressure reactive area, coil spring means acting upon said valve spool and with the pressure on said second pressure reactive area against the fluid pressure force exerted upon said first pressure reactive area for biasing said valve spool towards a closed position, and means providing for a pilot valve passage extending from said second pressure reactive area to said pilot valve element for opening said pilot valve element at said predetermined pressure and establishing flow through said restricted passage for creating a pressure differential upon the pressure reactive areas of said fourth valve spool portion.

20. A valve assembly as set forth in claim 19 wherein the pilot valve passage includes a passage extending coaxially through the valve spool.

21. A valve assembly as set forth in claim 19 wherein the pilot valve passage extends at least in part through the valve housing.

22. A valve assembly as set forth in claim 19 wherein the pilot valve assembly includes a discharge passage adapted to receive fluid when the pilot valve element is opened, said pilot valve discharge passage extending to the other of the valve housing passages.

23. A valve assembly as depends on claim 19 wherein the pilot valve assembly includes a discharge passage adapted to receive control fluid when the pilot valve element is opened, said discharge passage of said pilot valve assembly being adapted at communication with a low-pressure area independently of the valve housing passages.

24. A valve assembly as set forth in claim 19 further including a piston override for operating the valve spool independently of the pilot valve assembly, said piston override comprising a piston, said piston having a first position adapted to engage said valve spool and a second cylindrical portion, means defining a bore for slidably supporting said second portion of said piston concentrically with the valve housing bore, and means for pressurizing one side of said piston for bringing said piston into actuating engagement with said valve spool.

25. A valve assembly as set forth in claim 19 further including a pilot flow compensator for restricting the amount of control fluid passing through the pilot valve passage when the valve spool moves to its open position.

26. A valve assembly as set forth in claim 19 further including means for adjusting the degree of movement of the valve spool.

27. A valve assembly as set forth in claim 19 wherein the coil spring means is received with a bore formed in the second and fourth portions of the valve spool, the pilot valve passage means comprising said valve spool bore and a passage extending from said valve spool bore through the first and third portions of said valve spool, the open end of said valve spool bore forming an inlet to said pilot valve passage, and a pilot flow compensator supported at the blind end of said valve housing bore and juxtaposed to said inlet end of said pilot valve passage for substantially restricted flow of control fluid through said pilot valve passage when said valve spool is not in its closed position.

28. A valve assembly as set forth in claim 27 wherein the pilot flow compensator is operative to restrict the control fluid flow only when the valve spool is in its fully opened position.

29. A valve assembly as set forth in claim 27 wherein the pilot flow compensator is supported by one end of the coil spring in a free floating relationship to the valve housing.

30. A valve assembly as set forth in claim 27 further including means for adjusting the position of the pilot flow compensator along the axis of the valve housing bore for limiting the degree of movement of the valve spool.

31. A valve assembly as set forth in claim 30 wherein the pilot flow compensator is supported by one end of the coil spring in a free floating relationship to the valve housing.

32. In a valve housing having a main valve member, a first port, a second port, control means on said main valve member for controlling the flow between said ports, pressure reactive means on said main valve member defining first and second opposed pressure reactive areas, said first pressure reactive area being exposed to the pressure in said first port, means including a restricted passage for transmitting fluid from said first port to said second pressure reactive area of said pressure reactive means of said main valve member, said main valve member being biased to a first position when the pressure acting on said first and said second pressure reactive areas substantially in a predetermined relationship, means for establishing a flow through said restricted passage whereby a pressure differential is established upon said pressure reactive means of said main valve member for moving said main valve member from its first position to a second position, the improvement comprising means for restricting the flow through said restricted passage when said main valve member is not in its first position.

33. A valve as set forth in claim 32 wherein the means for establishing the flow through the restricted passage comprises a pilot valve responsive to the pressure on the second pressure reactive area of the main valve member.

34. A valve as set forth in claim 33 further including means for adjusting the position of the means for restricting the flow through the restricted passage, the last named means being juxtaposed to the main valve member for controlling the movement of the main valve member.

35. A valve as set forth in claim 32 further including means for adjusting the position of the means for restricting the flow through the restricted passage, the last-named means being juxtaposed to the main valve member for controlling the movement of the main valve member.

UNITED STATES PATENT OFFICE
CERTIFICATE OF CORRECTION

Patent No. 3,613,715          Dated October 19, 1971

Inventor(s) Charles E. Johnson

It is certified that error appears in the above-identified patent and that said Letters Patent are hereby corrected as shown below:

Column 2, line 57, delete "through" first occurrence and substitute therefor --and--
Column 4, line 45, after "passage" insert --39 is--
Column 5, line 12, delete "caused" and substitute therefor --causes--
Column 6, line 31, delete "received" and substitute therefor --receives--
Column 6, line 37, delete "A" and substitute therefor --An--
Column 6, line 44, after "screw" insert --103--
Column 7, line 49, delete "remove" and substitute therefor --removed--
Column 16, line 52, delete "housing"

Signed and sealed this 2nd day of May 1972.

(SEAL)
Attest:

EDWARD M. FLETCHER, JR.          ROBERT GOTTSCHALK
Attesting Officer                 Commissioner of Patents